April 1, 1924. 1,488,592
C. E. FOSTER
MECHANISM FOR OPERATING TRANSMISSIONS
Filed Jan. 30, 1922 2 Sheets-Sheet 1
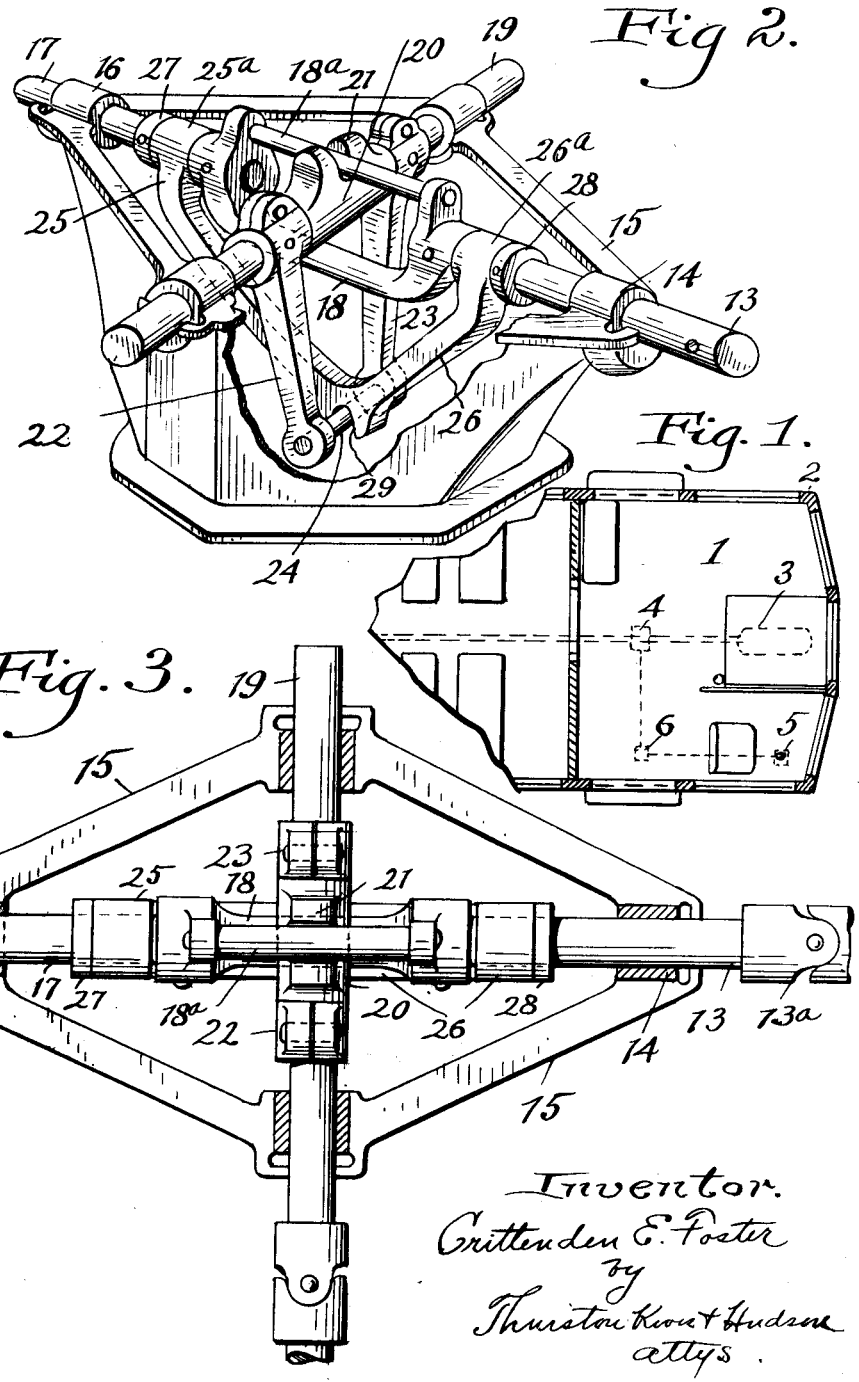

April 1, 1924.
C. E. FOSTER
1,488,592
MECHANISM FOR OPERATING TRANSMISSIONS
Filed Jan. 30, 1922  2 Sheets-Sheet 2
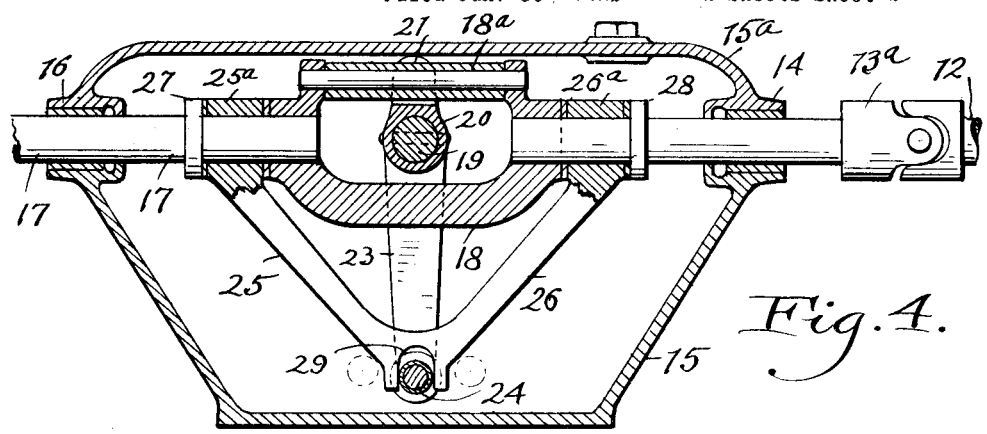
Fig. 4.
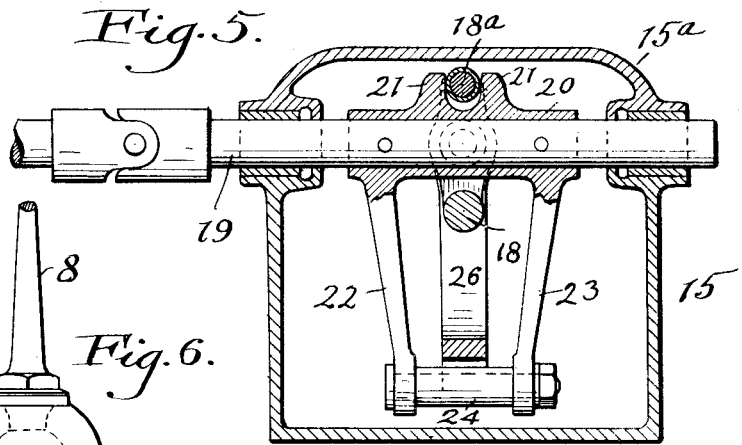
Fig. 5.
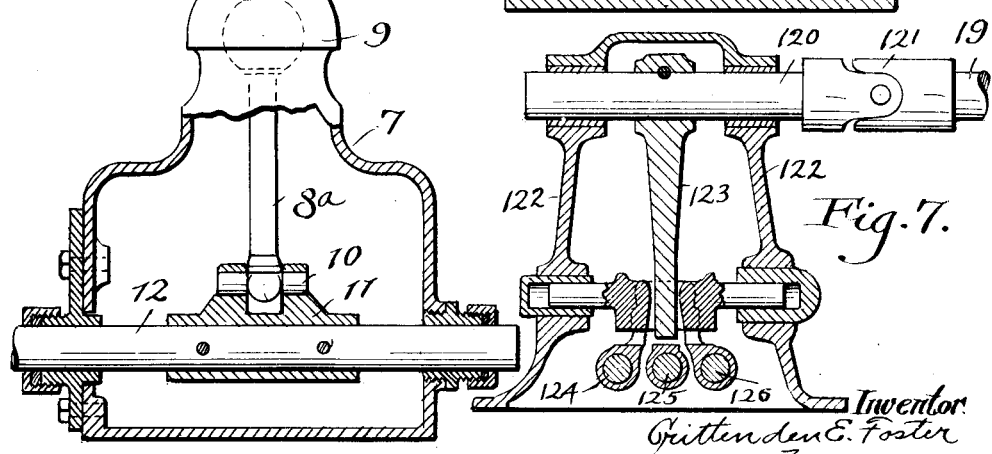
Fig. 6.
Fig. 7.
Inventor
Crittenden E. Foster
by
Thurston Kwis & Hudson
attys.

Patented Apr. 1, 1924.

1,488,592

UNITED STATES PATENT OFFICE.

CRITTENDEN E. FOSTER, OF CLEVELAND, OHIO, ASSIGNOR TO THE WHITE COMPANY, OF CLEVELAND, OHIO, A CORPORATION OF OHIO.

MECHANISM FOR OPERATING TRANSMISSIONS.

Application filed January 30, 1922. Serial No. 532,683.

*To all whom it may concern:*

Be it known that I, CRITTENDEN E. FOSTER, a citizen of the United States, residing at Cleveland, in the county of Cuyahoga and State of Ohio, have invented a certain new and useful Improvement in Mechanism for Operating Transmissions, of which the following is a full, clear, and exact description.

The present invention relates to a construction which in its broadest aspect may be considered as mechanism for transmitting rectilinear and rotary motion from a given point or station to another point or station through a right angle path of movement. More specifically, the mechanism herein described is used to transmit the necessary motion in shifting of gears in a transmission mounted on a vehicle where the shifting lever is stationed out of line with the transmission mechanism.

In the use of internal combustion engines for driving certain types of vehicles, such for instance, as vehicles which run on a track, it is under certain circumstances desirable to have the operator stationed at one side of the engine. Due to the fact that in power transmission from an internal combustion engine it is necessary to have the transmission gearing in line with the crank shaft of the engine, and if then it be desired to have the operator positioned at one side of the engine, and the operating lever for the shifting of transmission gears also located at one side of the engine, there is necessity for transmitting the rectilinear and oscillating movement necessary to shift the gears from the operating levers to the shifting mechanism in the transmission casing.

In the use of the present invention it is possible to have the operator stationed at any desired point with respect to the engine or the transmission gearing.

Referring to the drawings, Fig. 1 is a partial plan view with portions in section diagrammatically representing the placement of an engine, a transmission gear casing, and the herein described mechanism, on the front platform of a vehicle which is particularly intended for running on tracks. Fig. 2 is a perspective view of an element of the mechanism herein described; Fig. 3 is a top plan view of the showing in Fig. 2; Fig. 4 is a sectional elevation; Fig. 5 is a sectional elevation at right angles to that shown in Fig. 4; Fig. 6 is an elevation with portions in section of the mechanism directly manipulated by the operator; Fig. 7 is a sectional elevation showing the arrangement of the lever by which the shifting of the gears in the transmission housing is effected.

Without in any way intending to limit the invention, attention is called to Fig. 1 which shows the application, in a diagrammatic way, of the present invention to a railroad car or similar vehicle which is propelled by an internal combustion engine, and wherein the driving mechanism uses, as a part thereof, a shiftable transmission gear mechanism.

In the figure referred to the front platform of the car is indicated at 1, and the vestibule housing is generally represented at 2, and is so arranged as to enclose the engine, radiator and hood so that the front appearance of the car may be maintained in a conventional way without the hood of the engine projecting in front of the body of the car. 3 may diagrammatically represent the engine, and 4 may diagrammatically represent the transmission housing, which will contain transmission mechanism of standard or any desired construction and arrangement. At 5 will be located the lever by which the shifting of the gears in the transmission housing is effected, and at 6 is located that portion of the mechanism which is illustrated in Figs. 2 to 5 inclusive. The shifting lever and the mechanism associated therewith which is located at 5 is shown in Fig. 6, and comprises a housing 7 above which extends a rod or lever 8 which is sometimes referred to in the art as a cane shifting lever. So far as the mounting of this lever 8 is concerned, it is the same as quite commonly employed, to wit, having a ball and socket mounting as represented at 9, so that the cane lever may have substantially universal movement about its point of pivoting. The lower portion of the cane lever which is represented at 8ª is loosely and pivotally mounted on a pin 10 carried by a bracket 11 which in turn is rigidly secured to a shaft 12. It will be noted that the lever 8 may move in a direction so that the shaft 12 is given a linear movement, either forward or backward, and additionally, the lever 8 may move so that the shaft 12 is given a partial rotary movement in either direction.

The shaft 12 extends rearwardly and is secured to a shaft 13 preferably by means of a universal joint connection 13ª, as shown in Fig. 4. This shaft is mounted in a bearing 14 which is formed in a housing or casing 15, which casing is split and is provided with a cover such as indicated at 15ª in Fig. 4.

The mounting of the shaft 13 in its bearing 14 is such that it may rotate or slide longitudinally through the said bearing. Diametrically opposite to the bearing 14 is a second bearing 16 which is mounted upon the casing 15 and in this bearing there is a short shaft 17 which may rotate or slide within the bearing 16. To the opposed ends of the shafts 13 and 17 there is rigidly secured the opposite ends of a member which has a lower portion 18 which may be of sufficient dimension to give the necessary strength to the member, and there is also an upper member 18ª which extends substantially parallel with the member 18. The member 18ª may be of lighter construction than the member 18 because its function is merely to form a moving member. These members 18, 18ª, being as before stated, rigidly secured to the ends of the shafts 13 and 17, will partake of any rotary movement which the shaft 13 may be given, and may also reciprocate as the shaft 13 may be reciprocated.

Extending at substantially right angles to the shafts 13 and 17 is a shaft 19 to which is secured or with which there is integrally formed a member 20 which has upstanding ears 21 and between these ears there is an opening through which extends the member 18ª so that the shaft 19 may be given reciprocating movement by means of the connection just described when the shaft 13 is turned. Rigidly mounted upon the shaft 19 are two arms 22 and 23 which lie in the same plane, and at their lower ends these arms are connected by a rod 24. These arms 22 and 23 are spaced and lie respectively upon opposite sides of the member 20.

Loosely mounted upon the shaft 13 and the shaft 17 is a member which has two arms 25 and 26, each of which arms is formed with a collar portion such as indicated at 25ª and 26ª, through which the shafts 17 and 13 respectively extend, but the connection is a loose one so that the arms 25 and 26 do not partake of any rotary movement which the shafts 13 and 17 may have. These arms 25 and 26 are divergent arms, and straddle the members 18 and 18ª. For the purpose of definitely positioning the collars 25ª and 26ª retaining members 27 and 28 are mounted on the shafts 17 and 13 respectively, and are secured in place by any appropriate means, such for instance, as a set screw.

The construction which has just been described is such that the arms 25 and 26 will partake of any linear movement which the shaft 13 may have, but will not partake of any rotary movement which the shaft 13 may have.

At the lower portion of the arms 25, 26, where they join, is a re-entrant groove, and through this groove extends the rod 24 and in position so that it may contact with the side walls of the groove 29.

It will be apparent, therefore, that as linear movement is imparted to the shaft 13, the rod 24 will be moved by the arms 25, 26, and therefore through the arms 22, 23, the shaft 19 will be given a rotary movement in either a clockwise or counter-clockwise direction, in accordance with the direction of linear movement of the shaft 13.

From the foregoing description it will be seen that rectilinear movement which is imparted to the shaft 13 is transmitted to the shaft 19 as rotary movement, and on the other hand rotary movement which the shaft 13 may have is imparted to the shaft 19 as linear movement.

The shaft 19 or an extension thereof is connected to a short shaft 120 preferably by means of a universal joint connection such as indicated at 121 in Fig. 7. The shaft 120 is mounted in bearings in a suitable housing 122, which may form a part of the housing for the transmission mechanism. In any event it is associated with the housing of the transmission mechanism. This shaft 120 carries rigidly secured thereto a depending finger 123, and this finger is in position to co-operate with any one of a plurality of slidable shafts, such as 124, 125, 126, which slidable shafts carry gears that may be made to mesh with various gears forming the transmission, all of which is well understood by those in the art, and which need not be further explained because the transmission per se forms no part of the present invention.

As before explained, the shaft 19 will have both rotary movement and liner movement imparted to it, and therefore the depending finger 123 will also be moved in an arcuate manner which may impart linear movement to whichever shaft of the three mentioned, to wit, 124, 125, 126, the finger 123 may be in contact with. Also the finger 123 may be shifted in a sidewise direction so as to bring it into position to co-operate with any one of the shafts 124, 125, 126.

Attention is called to the fact that forward and backward movement of the cam lever 8 produces arcuate movement of the finger 123, or in other words, a forward and backward movement thereof because when the lever 8 is moved to a forward or backward movement, it will cause linear movement of the shaft 12 and also the shaft 13. This will in turn cause rotary movement of the shaft 19, and rotary movement of the shaft 19 causes arcuate movement of the finger 123. Similarly, sidewise movement of the shaft 8 causes sidewise movement of the finger 123.

Having described my invention, I claim:—

1. The combination with a member to be moved in either of two directions at substantially right angles, of a remote operating member capable of movement in either of two directions at substantially right angles, and means connecting said members, said means including two shafts extending at right angles to each other which are inter-connected so that linear and rotary movement of one shaft is communicated to the other shaft as rotary and linear movement respectively whereby upon operation of the operating member movement in similar direction is imparted to the first member.

2. In combination with a member to be moved in either of two directions at substantially right angles, of a remote operating member capable of movement in either of two directions at substantially right angles and in planes parallel to the movement of the first mentioned member, and means connecting said members said means including two shafts extending at right angles to each other which are inter-connected so that linear and rotary movement of one shaft is communicated to the other shaft as rotary and linear movement respectively whereby upon operating of the operating member, movement in similar direction and in parallel plane is imparted to the first mentioned member.

3. The combination with a member to be moved in either of two directions, of a shaft on which said member is mounted said shaft being capable of sliding movement or turning movement, a remote operating member, a second shaft associated with said member and connections between the said operating member and the second shaft for imparting linear movement or rotary movement to said second shaft, and means connecting the said shafts whereby rotary movement of the shaft associated with the operating member is transmitted to the shaft associated with the first mentioned member as linear movement, and linear movement imparted to the shaft associated with the operating member is transmitted to the shaft associated with the first mentioned member as rotary movement.

4. The combination with a member to be moved in either of two directions at substantially right angles, of a remote operating member capable of movement in either of two directions at substantially right angles, mechanism connecting said members said connecting mechanism including parts which have sliding connection with each other at substantially right angles whereby upon operation of the operating member movement in similar direction is imparted to the first mentioned member.

5. The combination with a member to be moved in either of two directions at substantially right angles, of a remote operating member capable of movement in either of two directions at substantially right angles, mechanism connecting said members said connecting mechanism including two parts which have sliding connections with each other at substantialy right angles, linear movement and rotary movement of one of said parts being transmitted to the other of said parts as rotary movement and linear movement respectively, whereby upon operation of the operating member movement in a similar direction is imparted to the first mentioned member.

6. The combination with a member to be moved in either of two directions at substantially right angles, of a remote operating member capable of movement in either of two directions at substantially right angles and in planes parallel with the planes of movement of the first mentioned member, mechanism connecting said members said connecting mechanism including parts which have connection with each other at substantially right angles whereby upon operation of the operating member movement in a similar direction and in a parallel plane is transmitted to the first mentioned member.

7. The combination with a member to be moved in either of two directions at substantially right angles, of a remote operating member capable of movement in either of two directions at substantially right angles, mechanism connecting said members said mechanism including a part which is connected to the operating member and a part which is connected with the first mentioned member the said parts being connected by an articulation which transmits linear motion and rotary motion from one part to the other part as rotary motion and linear motion respectively.

8. The combination with a member, a first shaft on which said member is rigidly mounted, means for mounting said first shaft to permit rotary movement and linear movement thereof, an operating lever, a second shaft connected with said operating lever, means for mounting said second shaft so as to permit rotary movement and linear movement, the said shafts being mounted so that their axes are at right angles to each other, and means connecting the said shafts whereby linear movement of the second shaft associated with the operating lever is transmitted to the first shaft as rotary movement and rotary movement of the second shaft is transmitted to the first shaft as linear movement.

9. The combination with a member, a first shaft on which said member is rigidly mounted, means for mounting said first shaft to permit rotary movement and linear movement thereof, an operating lever, a second shaft connected with said operating lever, means for mounting said second shaft so as to permit rotary movement and linear movement, the said shafts being mounted so that their axes are at right angles to each other, a pair of shafts which extend at right angles to each other one of said shafts being connected with the first shaft and the other of said shafts being connected with the second shaft, and means for operatively connecting the said pair of shafts whereby linear movement of the second shaft associated with the operating lever is transmitted to the first mentioned shaft as rotary movement, and rotary movement of said second shaft is transmitted to the first shaft as linear movement.

10. The combination with a member, a first shaft on which said member is rigidly mounted, means for mounting said first shaft to permit rotary movement and linear movement thereof, an operating lever, a second shaft connected with said operating lever, means for mounting said second shaft so as to permit rotary movement and linear movement, the said shafts being mounted so that their axes are at right angles to each other, a pair of shafts extending at right angles to each other one of said shafts being connected with the first shaft and the other of said shafts being connected with the second shaft, means connecting said pair of shafts comprising sliding and rotating parts whereby linear or rotary movement of one shaft is transmitted to the other shaft as rotary or linear movement respectively.

11. The combination with a member, a first shaft on which said member is rigidly mounted, means for mounting said first shaft to permit rotary movement and linear movement thereof, an operating lever, a second shaft connected with said operating lever, means for mounting said second shaft so as to permit rotary movement and linear movement, the said shafts being mounted so that their axes are at right angles to each other, a pair of shafts extending at right angles to each other one of said shafts being connected with the first shaft and the other of said shafts being connected with the second shaft, both of the shafts of said pair of shafts being mounted to have linear and rotary movement, a bar member carried by one of said shafts, a pair of ears carried by the other of said shafts between which the bar member extends, an offset arm being carried by the same shaft which carries the bar, and a yoke carried by the other of said shafts with which the offset arm co-operates whereby linear movement of the arm having the offset shaft is transmitted to the other shaft as rotary movement, and whereby rotary movement of the shaft with which the bar is associated is transmitted to the other shaft as linear movement.

12. The combination of a member which is mounted for linear movement and rotary movement, having a bar, a depending arm associated with said member and movable therewith, a second member extending at right angles to the first member and also mounted for rotary and linear movements, a pair of ears associated with the first member, the aforesaid bar extending between said ears, a depending arm carried by the second member and co-operating with the depending arm on the first member whereby linear movement of the first mentioned member is transmitted to the second mentioned member as rotary movement, and rotary movement of the first mentioned member is transmitted to the second mentioned member as linear movement.

13. The combination with a member which is mounted for rotary and linear movement, a second member which is mounted for rotary and linear movement and extending at right angles to the first member, means connecting the first member with the second member which permits linear movement of the first mentioned member without affecting the second mentioned member but which transmits rotary movement of the first mentioned member to the second member as linear movement, other means connecting the first mentioned member with the second mentioned member which transmits linear movement of the first mentioned member to the second mentioned member as rotary movement.

14. The combination with a member mounted for linear movement and rotary movement, of a second member mounted for linear movement and rotary movement, the said members extending at substantially right angles with respect to each other, the first member having as a part thereof a bar, the second member having as a part thereof an opening through which the bar extends the said bar having a sliding movement with respect to the second mentioned member when the first mentioned member is given linear movement and said bar imparting linear movement to the second member when the first mentioned member is rotated, an arm carried by the first mentioned member, and an arm carried by the second mentioned member, said arms being operatively connected to each other whereby linear movement of the first mentioned member is transmitted to the second mentioned member as rotary movement.

15. The combination with a member mounted for linear and rotary movement, of a second member mounted for rotary and linear movement, said members extending at substantially right angles to each other, the first mentioned member having as a part thereof a bar the second member having as a part thereof a pair of ears between which the bar extends, whereby upon linear movement of the first mentioned member the bar slides between the ears but upon rotary movement of the first member the bar causes linear movement of the second member, a depending yoke member carried by the first mentioned member, a depending yoke carried by the second mentioned member, the said yokes lying at right angles to each other, and one yoke straddling the other, one of said yokes being connected by the other whereby linear movement of the first mentioned member causes rotary movement of the second mentioned member.

In testimony whereof, I hereunto affix my signature.

CRITTENDEN E. FOSTER.